(12) United States Patent
Schilling et al.

(10) Patent No.: US 6,641,326 B2
(45) Date of Patent: Nov. 4, 2003

(54) REMOVABLE STUD FOR JOINING CASING FLANGES

(75) Inventors: Jan Christopher Schilling, Middletown, OH (US); James Edward Thompson, Middletown, OH (US); Frederick Joseph Zegarski, Cincinnati, OH (US); Kurt Thomas Hildebrand, Cincinnati, OH (US); Tod Kenneth Bosel, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 10/036,670

(22) Filed: Dec. 21, 2001

(65) Prior Publication Data

US 2003/0118399 A1 Jun. 26, 2003

(51) Int. Cl.$^7$ .................................................. F16B 35/00
(52) U.S. Cl. ........................ 403/337; 403/338; 411/389
(58) Field of Search ................................. 411/389, 383, 411/38; 403/337, 335, 336, 338, 305, 300

(56) References Cited

U.S. PATENT DOCUMENTS

| | | | |
|---|---|---|---|
| 2,782,883 A | 2/1957 | Rosan ........................ 189/34 |
| 2,788,830 A | 4/1957 | Rosan ........................ 151/22 |
| 3,455,198 A | 7/1969 | Barrett ........................ 85/1 |
| 4,223,585 A | 9/1980 | Barth et al. ................ 85/42 |
| 4,304,503 A | 12/1981 | Gehring et al. ............. 403/407 |
| 4,673,240 A | * 6/1987 | Byfield, Jr. ................. 439/755 |
| 4,729,707 A | 3/1988 | Takahashi ................... 411/389 |
| 4,928,531 A | * 5/1990 | Schult et al. ............... 73/855 |
| 5,769,583 A | 6/1998 | Girbinger ................... 411/389 |
| 5,772,252 A | * 6/1998 | Malani ........................ 285/4 |
| 6,491,487 B1 | * 12/2002 | Wojciechowski ........... 411/181 |

* cited by examiner

Primary Examiner—John R. Cottingham
(74) Attorney, Agent, or Firm—Nathan D. Herkamp; Alfred J. Mangels

(57) ABSTRACT

A stud for interconnecting adjacent flanges of a flanged joint in a tubular casing. The flanges each contain apertures to receive the stud and each flange is inclined relative to the casing outer surface, with one flange extending radially outwardly and the other flange extending radially inwardly, as a result of which one end of the stud extends externally of the flanged joint and the other end extends internally. The stud includes an external formation that is of non-circular form and that is carried by the stud between the threaded ends to extend radially outwardly. The external formation is adapted to be engaged by an anti-rotation member to prevent unintended rotation of the stud. The stud is removable from the flanged joint without the need to completely disassemble the joint to remove a broken stud.

27 Claims, 7 Drawing Sheets

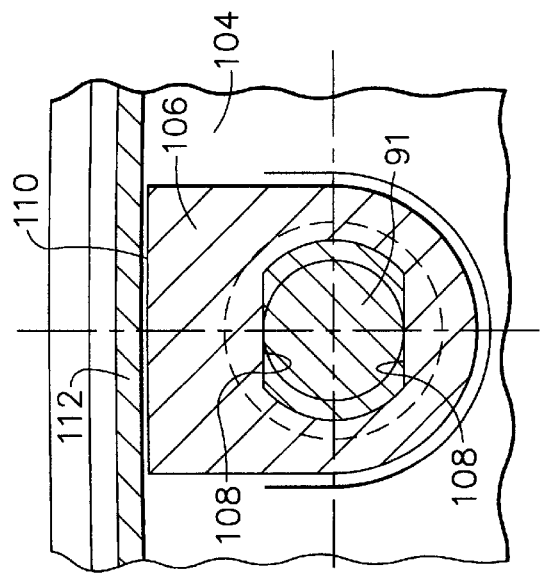
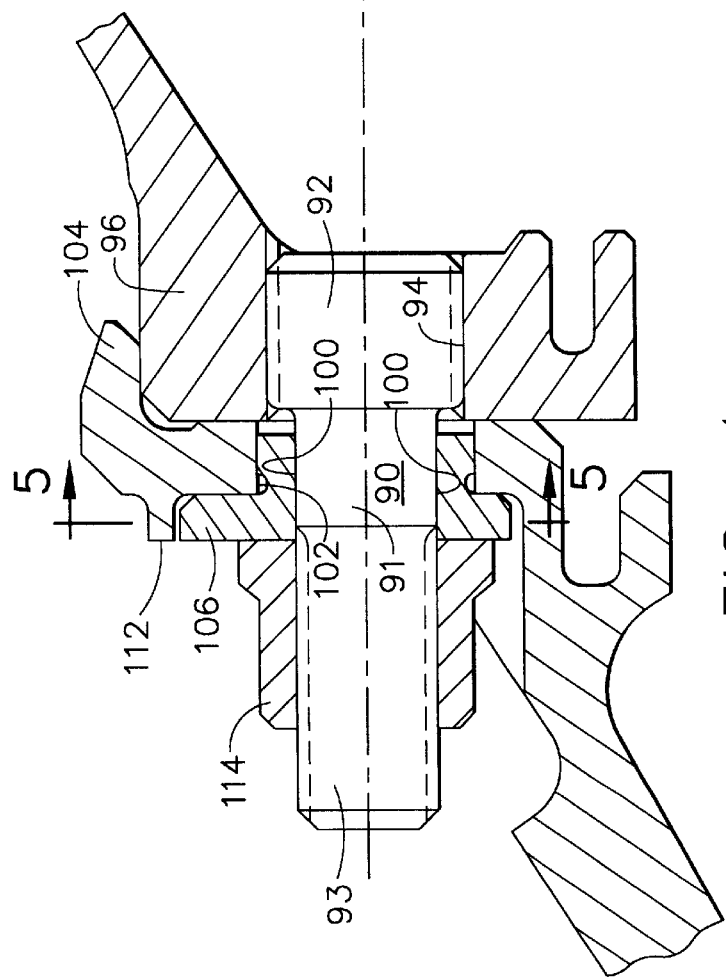
FIG. 5
FIG. 4

REMOVABLE STUD FOR JOINING CASING FLANGES

BACKGROUND OF THE INVENTION

1. Field of the Invention

The present invention relates to a double-ended stud that serves as a component of a fastening system for holding together a pair of elements in a desired relationship. More particularly, the present invention relates to a double-ended stud with an anti-rotation arrangement for retention of the installed stud in a threaded opening.

2. Description of the Related Art

In a flanged joint of a tubular conduit, wherein the joint is defined by a pair of opposed flanges, the joint is generally held together by means of a series of axially-extending, circumferentially-disposed bolts that pass through apertures provided in each of the flanges. Such connections are readily assembled and disassembled where the flanges extend substantially perpendicularly to the adjacent outer diametral surfaces of the joined conduits, such as in conventional pipe joints or tubular casing joints. However, when flanged-end pipes or flanged-end tubular casings are to be joined together and one or more of the pipe sections or casing sections to be joined have outer pipe or casing surfaces that are inclined relative to a plane extending between the opposed flange faces, it sometimes is necessary to increase the radial extent of the flanges in order to position the bolt holes for the connecting bolts so that there is sufficient space to be able to insert and remove the bolts during assembly and disassembly of the joint.

In aircraft engine casings that define converging or diverging flow passageways, the angle of inclination of the casing surfaces and plane extending between the opposed flange faces can be of the order of about 45 degrees or more. Increasing the radial extent of such flanges to facilitate access to each side of the flanged joint can result in substantial additional engine weight, which is, of course, undesirable in an aircraft engine. To avoid the need for casing flanges having undesirably large radial lengths, it is common to maintain rather short radially-extending flanges by providing a radially-outwardly-extending flange on one component of the flanged joint and a radially-inwardly-extending flange on the other component. The radially-inwardly-extending flange is sometimes referred to as an inverted flange.

The heads of the connecting bolts of such a flange structure thus engage an inner surface of the inwardly-extending flange, one that is within the casing, rather than a surface that lies outside the casing. In such an arrangement, should one or more of the connecting bolts break, as the result of excessive torque applied during the bolt tightening operation, either upon initial assembly or upon subsequent disassembly and re-assembly for repair or overhaul of the engine, it becomes necessary to disassemble the entire casing joint, along with the low-pressure turbine case hardware, in order to be able to obtain access to and to retrieve the head portions of the broken bolts. Such disassembly and re-assembly operations consume considerable time, adding substantially to the cost of engine assembly or engine repair, should such bolt breakage occur at such flanged joints. It is desirable to provide a way of removing the retained portion of a broken connecting bolt without the need for complete disassembly of the flanged joint.

There is thus a need to provide a fastener arrangement for a flanged joint in a tubular conduit, wherein the components of the fastener arrangement are so configured as to enable the removal of one or more joint fasteners and substitution of new fasteners without the need for complete disassembly of the flanged joint.

SUMMARY OF THE INVENTION

Briefly stated, in accordance with one aspect of the present invention, there is provided a stud for interconnecting a pair of structures that each include a stud-receiving element. The stud includes a generally cylindrical shank including a first external thread adjacent to a first longitudinal end, and a second external thread adjacent to a second longitudinal end that is opposite from the first end. The first and second threads each terminate at respective inner end points that are spaced from each other and that are inwardly of the respective ends of the stud to define an unthreaded region between the first and second threads. An anti-rotation element is carried by the shank in the unthreaded region between the inner end points of the threads and extends radially outwardly from the shank. The anti-rotation element has a non-circular peripheral surface that is adapted to be engageable with a complementary locking member that is carried by one of the structures to be interconnected by the stud.

In accordance with another aspect of the present invention, a flange connection is provided for connecting together a pair of casing end flanges of a pair of end-to-end axisymmetric casings. The connection includes a first casing having at least a first end flange that extends substantially radially outwardly from the casing, and a second casing having at least a second end flange that extends substantially radially inwardly from the casing and that is engageable with the first end flange. The end flanges each include a plurality of circumferentially-spaced apertures wherein corresponding apertures are substantially co-axially aligned. The first and second casing have outer surfaces that are inclined relative to a plane defined by the contacting flanges. A stud extends through a pair of aligned apertures, wherein one end of the stud is threadedly received in one of the aligned apertures and the other end of the stud extends outwardly of the other aligned aperture and is engaged by a retaining nut to hold the pair of flanges in face-to-face relationship. An anti-rotation element is provided that is carried by the shank of the stud between the ends thereof and that extends radially outwardly from the shank. The anti-rotation element has a non-circular peripheral surface that is adapted to be engageable with a complementary locking member that is carried by one of the structures to be interconnected.

BRIEF DESCRIPTION OF THE DRAWINGS

The structure, operation, and advantages of the present invention will become further apparent upon consideration of the following description, taken in conjunction with the accompanying drawings, in which:

FIG. 4 is a cross-sectional view of another embodiment of a connecting stud and flanged joint connection.

FIG. 5 is an end view of the stud shown in FIG. 4.

DESCRIPTION OF THE PREFERRED EMBODIMENTS

Figure 1:
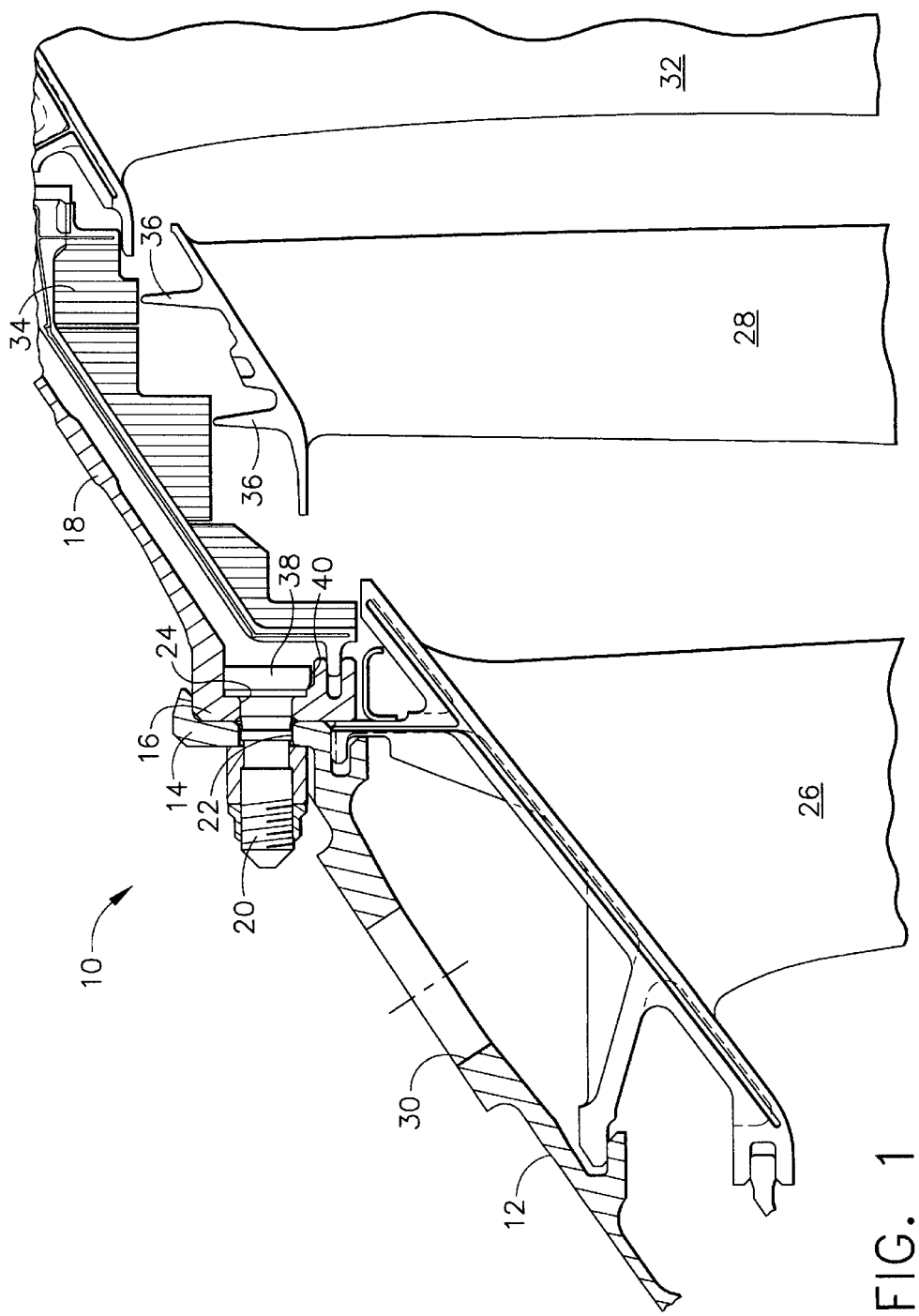
FIG. 1 is a fragmentary cross-sectional view taken through a prior art casing joint in an aircraft gas turbine engine.
Figure 2:
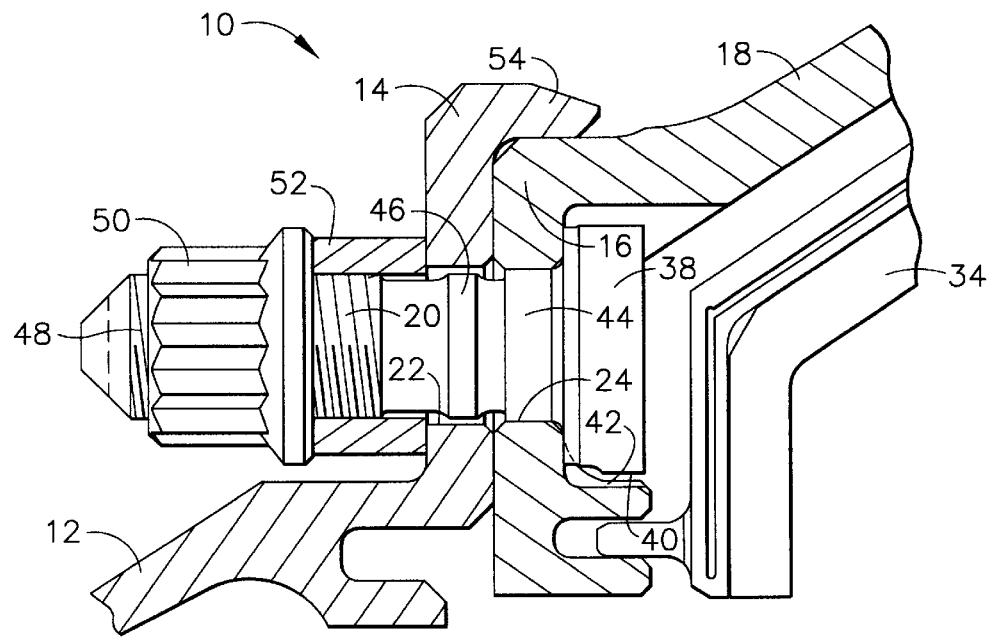
FIG. 2 is an enlarged, fragmentary view of a prior art connecting bolt arrangement of the type shown in FIG. 1.

Referring now to the drawings, and particularly to FIGS. 1 and 2 thereof, there is shown a cross-sectional view of a portion of a gas turbine engine casing joint 10. Joint 10, as shown, is at a turbine center frame that lies between an upstream, high-pressure turbine that drives the engine compressor (not shown), and a downstream, low-pressure turbine that is connected with and that drives a front-mounted fan (not shown) and a pressure booster (not shown) that is positioned between the fan and the compressor.

The low-pressure turbine is enclosed within an annular turbine center frame 12 that carries a radially-extending flange 14 at its downstream end. Turbine center frame flange 14 is connected with a complementary, low-pressure-turbine casing flange 16 that is carried at the upstream end of an annular, low-pressure turbine casing 18. Casing flanges 14, 16 are bolted together by a plurality of circumferentially-distributed connecting bolts 20 that extend through respective aligned apertures 22, 24 that pass through respective flanges 14, 16. As shown in FIG. 1, turbine center frame 12 and low-pressure turbine casing 18 together define a diverging flow passageway, in which the walls defining casings 12, 18 are inclined relative to the engine longitudinal axis (not shown) and relative to the axes of connecting bolts 20, the latter of which are disposed substantially parallel to the engine longitudinal axis.

Turbine center frame 12 supports a plurality of radially-extending, circumferentially-spaced first stage stator vanes 26 that direct high temperature combustion products from the high-pressure turbine to the low-pressure turbine. The low-pressure turbine includes a plurality of first stage rotor blades 28 that are carried on and that extend radially outwardly from a rotor disk (not shown) that is supported on a drive shaft (not shown). Low-pressure-turbine stator vanes 26 are cooled by cooling air that is directed through respective openings 30 provided in turbine center frame 12 and that convey cooling air to stator vanes 26. The low-pressure turbine includes a plurality of second stage stator vanes 32 that are positioned downstream of the first stage rotor blade and that are cooled with cavity cooling air that passes through openings (not shown) provided in casing 18. As shown in FIG. 1, low-pressure-turbine casing 18 also carries an annular shroud 34 that can be defined by a stepped, honeycomb-type sealing material, or the like, that is adapted to be in contact with peripherally-disposed, radially-extending labyrinth seals 36 carried by rotor blades 28.

Because the outer surfaces of each of turbine center frame 12 and low-pressure-turbine casing 18 are inclined relative to the bolt axes, and in order to avoid an excessively large radial dimension for the respective flanges 14, 16, low-pressure-turbine casing flange 16 extends radially inwardly relative to the casing to define an inverted flange. Accordingly, the head 38 of connecting bolt 20 is positioned within low-pressure-turbine casing 18 and thus apertures 24 in low-pressure-turbine casing flange 16 are blind apertures relative to the assembled casing joint. Consequently, if one of connecting bolts 20 breaks, as a result of excessive torque applied during assembly, disassembly, or re-assembly of casing joint 10, the remaining connecting bolts must be removed and the low-pressure turbine case hardware must be disassembled to provide access to the head of the broken bolt. Such disassembly requires considerable time and involves considerable cost.

FIG. 2 shows an enlarged detail of casing joint 10 shown in FIG. 1. Connecting bolt 20 has a head 38 that in end view is shaped like the letter "D," and it includes a flat surface 40 that is adapted to engage with an inner, axially-extending circumferential surface 42 forming part of casing flange 16. Circumferential surface 42 serves to limit rotational movement of head 38 of bolt 20 relative to flange 16. The shank of bolt 20 includes a first positioning ring 44 that has an outer surface that is adapted to engage the surface aperture 24 formed in casing flange 16 for orienting connecting bolt 20 relative to flange 16. Also included on the shank of bolt 20, and spaced axially from first positioning ring 44 is a second positioning ring 46 that has an outer diameter that is slightly smaller than the diameter of aperture 22 formed in casing flange 14, to enable proper circumferential positioning of flanges 14, 16 relative to each other during assembly of joint 10. The shank of bolt 20 also includes an external thread 48 to which a connecting nut 50 is engaged to bear against an annular spacer 52 that serves to space connecting nut 50 from flange 14 a distance sufficient to enable a wrench to engage the periphery of connecting nut 50. Casing flange 14, which will hereinafter be referred to as the "upstream flange," includes an outer, axially extending lip 54 that engages with and overlies a portion of casing flange 16, which will hereinafter be referred to as the "downstream flange," to facilitate proper positioning of the flanges relative to each other during assembly of joint 10.

Figure 3:
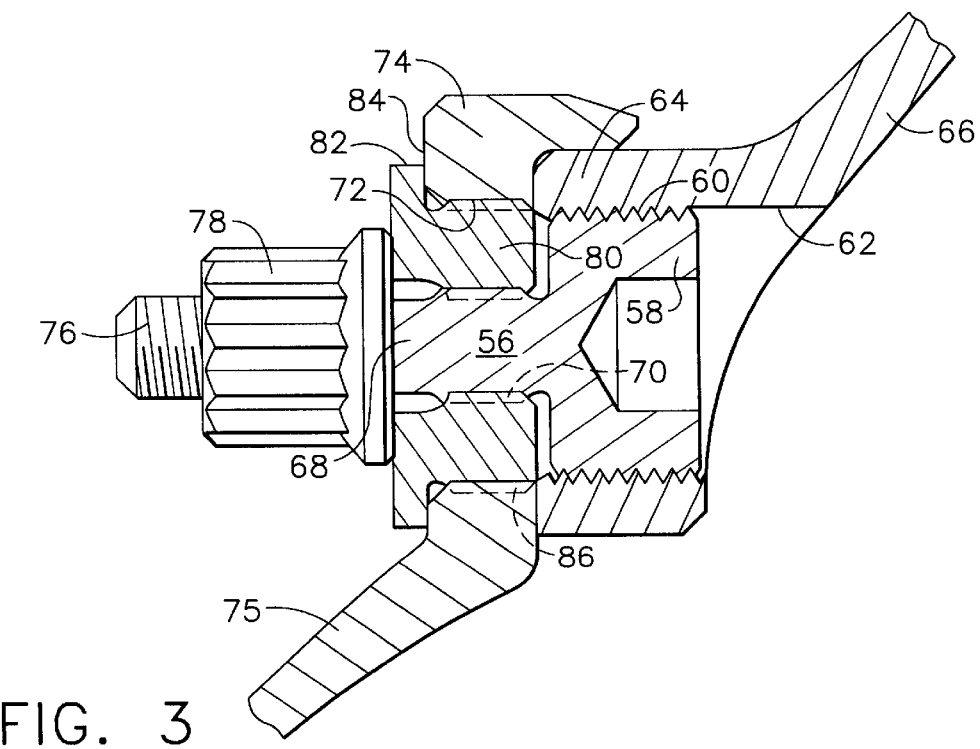
FIG. 3 is a fragmentary cross-sectional view of an embodiment of the present invention showing the components of a different joint connection arrangement including a double-ended connecting stud.

One embodiment of an arrangement to enable removal of a flange connection fastener in the event of fastener breakage, and without the need to completely disassemble the flanged joint, is shown in FIG. 3. A stud 56 is provided that includes an enlarged diameter head 58 that carries an external thread 60 that engages with a corresponding internal thread formed in a threaded aperture 62 in downstream flange 64 of casing 66. Stud 56 includes a reduced diameter shank 68 that carries an external spline 70 that is positioned relative to stud head 58 so that it is radially opposite from the inner surface of an aperture 72 formed in upstream flange 74 when stud head 58 is seated in flange 64. Stud shank 68 also carries an external thread 76 that engages with an internal thread carried by a connecting nut 78.

Aperture 72 in flange 74 has a larger diameter than that of aperture 62 in flange 64, to allow stud head 58 to freely pass through aperture 72 during assembly and disassembly of the fastener connection. Furthermore, aperture 72 carries an internal spline that axially slidingly receives a corresponding external spline carried by an anti-rotation element 80 in the form of an annular ring. Anti-rotation element 80 also carries an internal spline that axially slidingly engages with external spline 70 carried by stud shank 68, and it can also include a radially-outwardly-extending lip 82 that defines an outer flange adapted to contact the outwardly-facing surface of flange 74 to limit inward movement of anti-rotation ring 80 relative to aperture 72 in flange 74. Additionally, anti-rotation element 80 also carries an external spline 86 to axially slidingly engage with the internal spline in aperture 72 of flange 74.

The arrangement shown in FIG. 3 is assembled by threading enlarged head 58 of stud 56 into threaded aperture 62 of flange 64. That operation can be performed either before flanges 64 and 74 have been brought together or afterwards. The inward movement of stud head 58 during insertion into aperture 62 can be limited by a suitable internal stop (not shown) provided within or adjacent the inner end of aperture 62. The internal stop can be an interrupted thread, or the like, and is so arranged that when stud 56 is properly positioned in flange 64 the external spline 70 carried by stud 56 lies outwardly of flange 64.

When stud 56 is in position relative to flange 64, and after upstream casing 75 has been positioned relative to downstream casing 66 so that that the axes of apertures 62 and 72 in flanges 64, 74, respectively, are coaxial, anti-rotation element 80 is slipped over stud shank 68. External spline 86 carried by anti-rotation element 80 thus engages with the internal spline formed in aperture 72, and the internal spline carried by anti-rotation element 80 engages with external spline 70 on stud shank 68. Consequently, by virtue of the splined, non-rotatable connection between anti-rotation element 80 and flange 74, anti-rotation element 80 serves to prevent rotation of stud 56. After anti-rotation element 80 has been properly installed, connecting nut is attached to stud 56 to secure the connection.

Removal of stud 56, or of a broken portion, is effected by reversing the steps for the installation procedure. Thus, if the stud breaks as a result of excessive torque, the break will most often occur at the smaller diameter, threaded end. Removal of the remaining stud portion can be effected by axially sliding the anti-rotation element 80 outwardly to disengage both the stud spline 70 and the aperture spline 86, whereupon the stud portion can be unthreaded from the downstream flange, using spline 70, without requiring complete disassembly of the flanged joint and the separation of the respective casings to effect fastener removal, as was the case in the prior art arrangement shown in FIGS. 1 and 2. Consequently, a new connecting stud can easily be installed, along with the anti-rotation ring and the locking nut, to effect the fastener replacement.

Another embodiment of a fastener arrangement to allow quick replacement of a flanged connection fastener in a flanged joint involving an inverted flange is shown in FIGS. 4 and 5. A stud 90 is provided having a shank 91 and having an enlarged, threaded first end 92, and including a reduced diameter threaded second end 93. First end 92 engages with a correspondingly threaded aperture 94 formed in a downstream flange 96. Between enlarged first end 92 and an externally-threaded second end 93 is an intermediate section of stud shank 91 that includes a pair of diametrically-opposed flat outer surfaces 100 that are so positioned as to be opposite an aperture 102 formed in upstream flange 104 when stud 90 is in its operative, fully-installed position. An anti-rotation element 106, which can be in the form of a D-head as shown, has a correspondingly-shaped opening including a pair of opposed flat surfaces 108 for engagement with stud shank 91, as best seen in FIG. 5. Anti-rotation element 106 includes an outer surface that is substantially flat, or that can be slightly bowed if desired, to engage with a forwardly-extending step 112, which can be in the form of a continuous annular ring, as shown, or it can be in the form of individual, circumferentially-spaced projections that lie radially outwardly of a series of respective apertures 102 formed in flange 104. Anti-rotation element 106 is held in position by a connecting nut 114.

Flat surface 110 on anti-rotation element 106 cooperates with step 112 to prevent rotation of anti-rotation element 106 relative to flange 104. Thus, anti-rotation element 106 is non-rotatably carried on stud shank 91 and stud 90 is restrained from rotation relative to flange 104 by virtue of the inner and outer flat surfaces 108 and 110 carried by anti-rotation element 106. Again, as with the embodiment shown in FIG. 3, the embodiment of FIGS. 4 and 5 also enables easy removal of a broken stud and replacement with a new stud without requiring complete disassembly of the flange joint.

Figure 7:
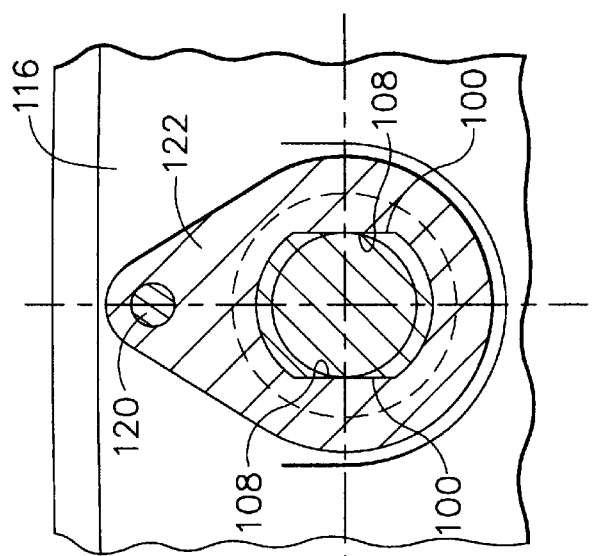
FIG. 7 is an end view of the stud and joint connection shown in FIG. 6.
Figure 6:
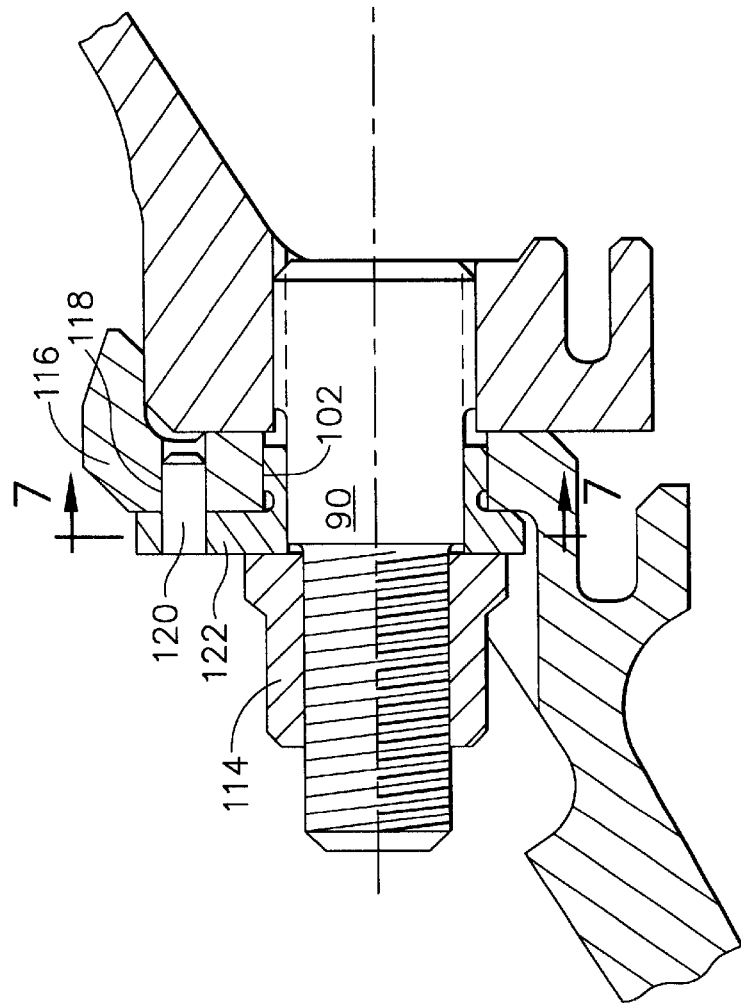
FIG. 6 is a cross-sectional view of another embodiment of a connecting stud and flanged joint connection.

A further embodiment of an anti-rotation element is shown in the embodiment of FIGS. 6 and 7. As shown, the structure of stud 90 is the same as the stud structure shown in the embodiment of FIGS. 4 and 5. However, upstream flange 116 does not include the forwardly-extending step 112 shown in FIGS. 4 and 5 but, instead, includes an aperture 118 that is spaced from and adjacent to flange aperture 102 and that has a smaller diameter than that of flange aperture 102. Aperture 118 is adapted to receive a retainer pin 120 carried by anti-rotation element 122 that includes a stud-receiving opening having opposed flat surfaces 108 to engage with corresponding flat surfaces 100 carried by stud 90. Consequently, rotation of the stud is prevented by the non-rotational engagement between anti-rotation element 122 relative to flange 116, by virtue of the engagement of retainer pin 120 with aperture 118 in flange 116. Again, it will be apparent that a broken stud can be easily and quickly removed and replaced without disassembling the entire flanged joint.

Another embodiment of a removable stud that can be utilized in a flanged joint having an inverted flange is shown in FIGS. 8 through 13. Stud 130 includes a shank 132 that carries a first external thread 134 adjacent a first end 136, and a second external thread 138 adjacent a second end 140 that is axially spaced from first end 136. Threads 134, 138 can be of the same size, type, and hand, if desired. Instead of stud 130 being directly threadedly engaged with an internally-threaded aperture in downstream flange 142 connected with casing 144, as is the arrangement in the previously-described embodiments, end 136 of stud 130 is threadedly engaged with an internally-threaded bushing 146 that is retained in an unthreaded opening 148 in flange 142. Opening 148 includes a countersink 150 at its upstream end and a smaller diameter end of bushing 146 is swaged so that it lies against countersink 150 to limit inward movement of bushing 146 relative to opening 148.

The opposite end of bushing 146 includes an enlarged, D-shaped head 152 that has a flat surface 154 that is disposed opposite to and adjacent an inner ledge 156 carried by flange 142. Ledge 156 serves to limit rotational movement of bushing 146 relative to flange 142 by virtue of contact between ledge 156 and flat surface 154. Bushing 146 is thus restrained both from axial as well as rotational movement relative to flange 142.

Figure 8:
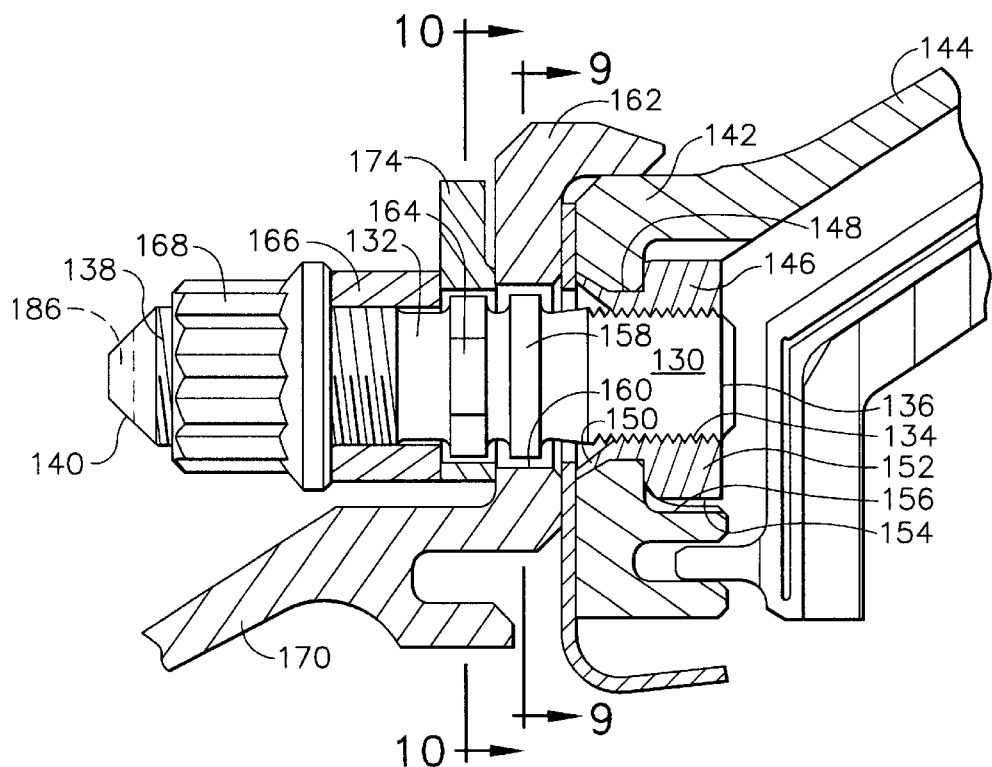
FIG. 8 is a cross-sectional view of another embodiment of a connecting stud and flanged joint connection.
Figure 9:
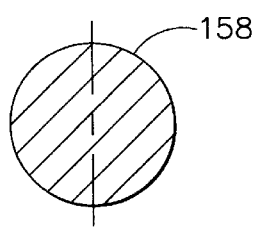
FIG. 9 is a cross-sectional view taken along the line 9—9 of FIG. 8.
Figure 10:
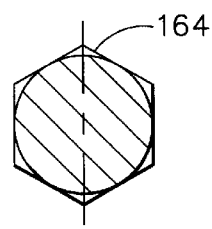
FIG. 10 is a cross-sectional view taken along the line 10—10 of FIG. 8.

Shank 132 of stud 130 includes an enlarged diameter positioning ring 158 between threads 134 and 138, as shown in cross section in FIG. 9. Positioning ring 158 is adapted to lie opposite the inner surface of aperture 160 formed in upstream flange 162 when stud 130 is in its operative position. Also carried on shank 132, between positioning ring 158 and second thread 138, is a radially-outwardly-extending projection 164. As shown in cross section in FIG. 10, projection 164 has a hexagonal cross section. However, projection 164 can have any polygonal cross section and can have any desired number of interconnected linear surface segments. Positioned forwardly of projection 164 in the arrangement of an assembled joint as shown in FIG. 8 is an annular spacer 166, to space connecting nut 168 a sufficient distance from the outer surface of upstream casing 170.

Figure 12:
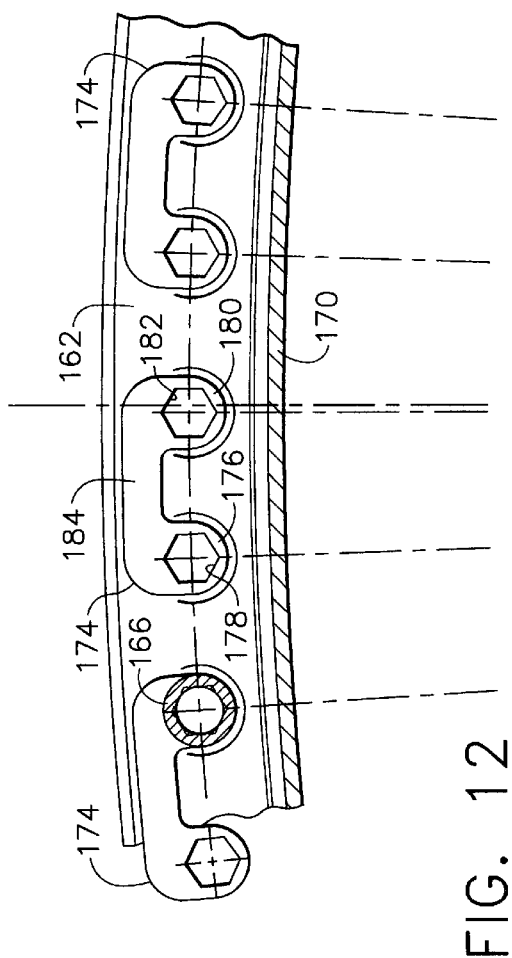
FIG. 12 is an axial view of the stud in connection shown in FIG. 8.
Figure 13:
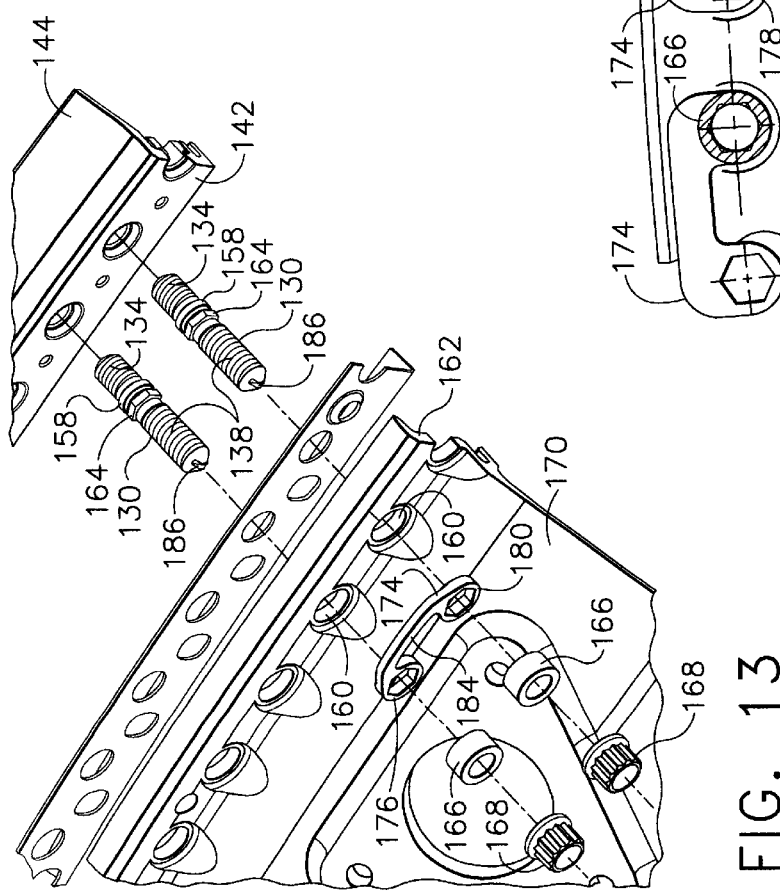
FIG. 13 is an exploded view of the stud and joint connection shown in FIG. 8.

Rotation of stud 130 after installation in flange 142 is restrained by an anti-rotation element 174. The configuration of anti-rotation element 174 is best seen in FIGS. 12 and 13. As shown, element 174 extends between and engages the respective projections 164 carried by each of two adjacent studs 130, and it includes a first annular retainer member 176 including an opening 178 having a cross section that corresponds substantially in size and shape with that of a projection 164 on stud 130, and a second retainer member 180 including an opening 182 also having an opening that conforms substantially in size and shape with that of a projection 164. Retainer members 176, 180 are interconnected by a rigid interconnecting strap 184 to provide a one-piece anti-rotation element 174. Consequently, rotation of each of a pair of adjacent studs 130 is prevented by the locking effect of the interengagement of retainer members 176, 180 with respective stud projections 164. Although shown in FIGS. 12 and 13 as extending between and interconnecting two adjacent studs, anti-rotation element 174 can be so configured as to be connectable with and extend between a larger number of studs, if desired. Again, as with the earlier-described embodiments, the stud arrangements shown in FIGS. 8 through 13 allow quick and easy removal of a broken stud without requiring disassembly of the entire flanged joint.

Figure 11:
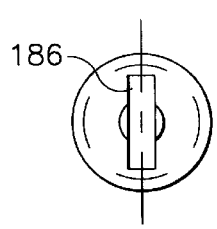
FIG. 11 is an end view of the stud shown in FIG. 8.

The forwardmost end 140 of stud 130, as oriented in the joint as shown, includes a stud adjustment formation 186, which can be in the form of a diametrically-disposed, interiorly-extending slotted opening, as shown in FIGS. 11 and 13, to allow rotational adjustment of the orientation of stud 130 before final assembly of the joint, to permit alignment between complementary engagement surfaces of projection 164 carried by stud 130 and the openings in anti-rotation element 174. Although shown as having a slotted form, it will be appreciated by those skilled in the art that other forms of opening could also be provided, such as a square opening, or a hexagonal opening, such as to receive an Allen wrench, or the like. Moreover, adjustment formation 186 can alternatively be an external formation, such as a square or hexagonal outer end, or the like.

Figure 14:
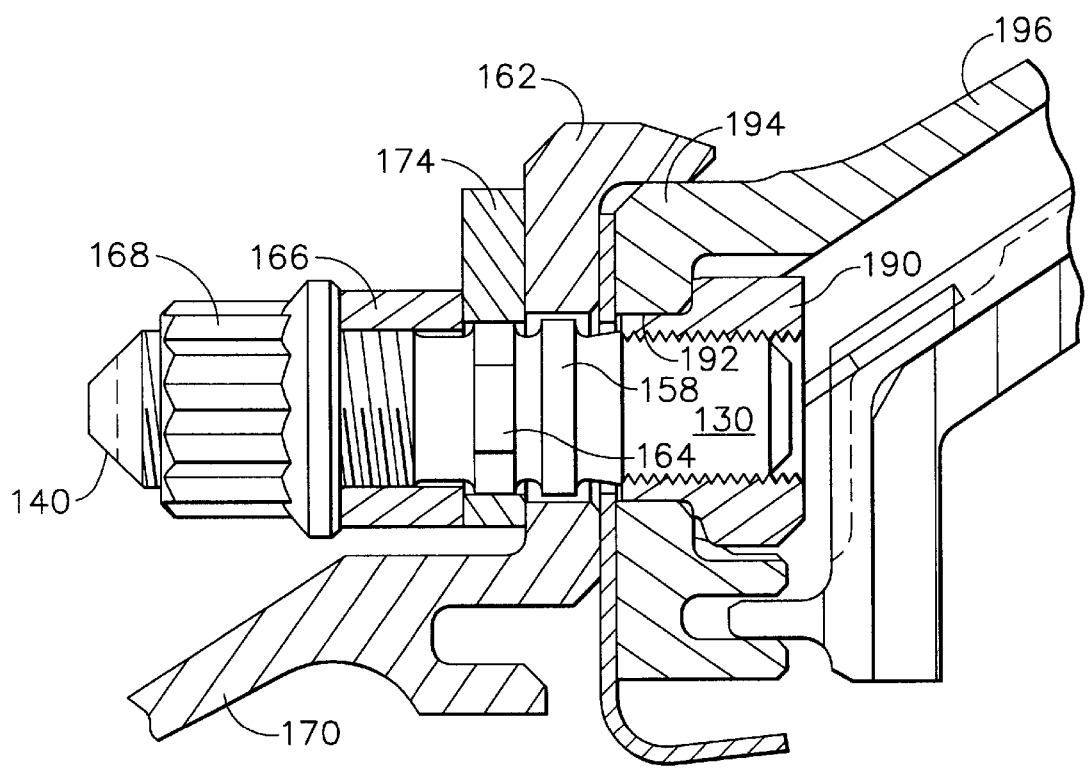
FIG. 14 is a cross-sectional view of a further embodiment of a connecting stud and flanged joint connection.

A variant of the arrangement shown in FIGS. 8 through 13 is shown in FIG. 14. Instead of the swaged interconnection of bushing 146 in flange 142 as shown in FIG. 8, the FIG. 14 embodiment includes a bushing 190 that has a smaller diameter end that defines an interference fit with aperture 192 in flange 194 of casing 196. Bushing 190 is pressed into aperture 192 so as to prevent axial movement of bushing 190 relative to flange 194. In other respects, the joint structure shown in FIG. 14 corresponds with that shown in FIGS. 8 through 13.

Although particular embodiments of the present invention have been illustrated and described, it would be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A stud for interconnecting a pair of components that each include a stud-receiving aperture, said stud comprising:
   a generally cylindrical shank including a first external thread adjacent a first longitudinal end, and a second external thread adjacent a second longitudinal end opposite from the first end, wherein the first and second threads each terminate at respective inner end points spaced from each other and inwardly of the respective ends to define an unthreaded region between the first and second threads, at least one longitudinal end of the shank including a stud rotation formation to allow rotational orientation of the stud; and
   an external formation carried by the shank in the unthreaded region between the inner end points of the threads and extending radially outwardly from the shank, the external formation having a peripheral surface that is engaged with a complementary anti-rotation member to prevent unintended rotation of the stud relative to the anti-rotation member.

2. A stud in accordance with claim 1, wherein the external formation has a non-circular form.

3. A stud in accordance with claim 1, wherein the external formation is a spline.

4. A stud in accordance with claim 3, wherein the first external thread has a larger pitch diameter than the second external thread.

5. A stud in accordance with claim 4, wherein the first and second threads are of the same hand.

6. A stud in accordance with claim 1, wherein the external formation is at least one axially-extending flat surface.

7. A stud in accordance with claim 1, wherein the external formation is a pair of flat surfaces.

8. A stud in accordance with claim 7, wherein the flat surfaces face in opposite directions.

9. A stud in accordance with claim 8, wherein the flat surfaces are substantially parallel.

10. A stud in accordance with claim 1, wherein the external formation has a polygonal cross-section.

11. A stud in accordance with claim 10, wherein the external formation has a hexagonal cross-section.

12. A flange connection for connecting together a pair of casing end flanges of a pair of end-to-end, axisymmetric tubular casings, said connection comprising:
   a) a first casing having at least a first end flange that extends substantially radially outwardly relative to the first casing, and a second casing having at least a second end flange that extends substantially radially inwardly relative to the second casing and that is engageable with the first end flange, wherein the end flanges each include a plurality of circumferentially-spaced apertures and wherein corresponding apertures of the respective flanges are substantially coaxially aligned;
   b) a stud extending through a pair of aligned flange apertures in respective ones of the first and second casings and including a stud shank, wherein one end of the stud is threadedly received within a threaded aperture provided in the second casing and the other end of the stud extends outwardly of the other aligned flange aperture in the first casing and is engaged by a connecting nut to hold the pair of flanges in face-to-face relationship;
   c) an external formation carried by the stud in an inner region between end threads formed on respective ends of the stud, wherein the external formation extends radially outwardly from the stud and has a peripheral surface; and d) an anti-rotation member engageable with the peripheral surface of the external formation to prevent unintended rotation of the stud relative to the casing end flanges after the flanges have been connected.

13. A flange connection in accordance with claim 12, wherein the peripheral surface is non-circular.

14. A flange connection in accordance with claim 12, wherein the anti-rotation member is non-rotatably connected with one of the flanges.

15. A flange connection in accordance with claim 12, wherein the external formation includes an external spline and the anti-rotation member includes an internal spline that is adapted to slidably receive and engage with the external spline.

16. A flange connection in accordance with claim 12, wherein the external formation includes at least one flat surface and the anti-rotation member includes a complementary flat surface.

17. A flange connection in accordance with claim 12, including a fixed projection carried by at least one flange and engageable with the anti-rotation member to limit rotation of the stud relative to the at least one flange.

18. A flange connection in accordance with claim 12, wherein the anti-rotation member includes an axially-extending projection, and at least one flange includes a complementary element to engage with the axially-extending projection to limit rotational movement of the anti-rotation member.

19. A flange connection in accordance with claim 12, wherein the external formation has a non-circular cross section and includes at least one flat surface that lies in a plane parallel to the stud axis.

20. A flange connection in accordance with claim 12, wherein an aperture in at least one flange carries an internally-threaded bushing adapted to threadedly receive an end of the stud.

21. A flange connection in accordance with claim 20, wherein one end of the bushing is swaged against an end of the flange aperture and an opposite end of the bushing includes an enlarged head.

22. A flange connection in accordance with claim 21, wherein the enlarged head includes a flat surface that lies in a plane that is parallel with the axis of the bushing and that is engageable with a similarly oriented surface carried by the flange.

23. A flange connection in accordance with claim 20, wherein the bushing is press fit into the flange aperture.

24. A flange connection in accordance with claim 14, wherein the anti-rotation member engages and extends between at least two studs.

25. A flange connection in accordance with claim 24, wherein the at least two studs are adjacent to each other.

26. A flange connection in accordance with claim 14, wherein the anti-rotation member is non-rotatably connected with the flange of the first casing.

27. A stud in accordance with claim 1, wherein the stud rotation formation is a slot.

* * * * *